Figure 1:
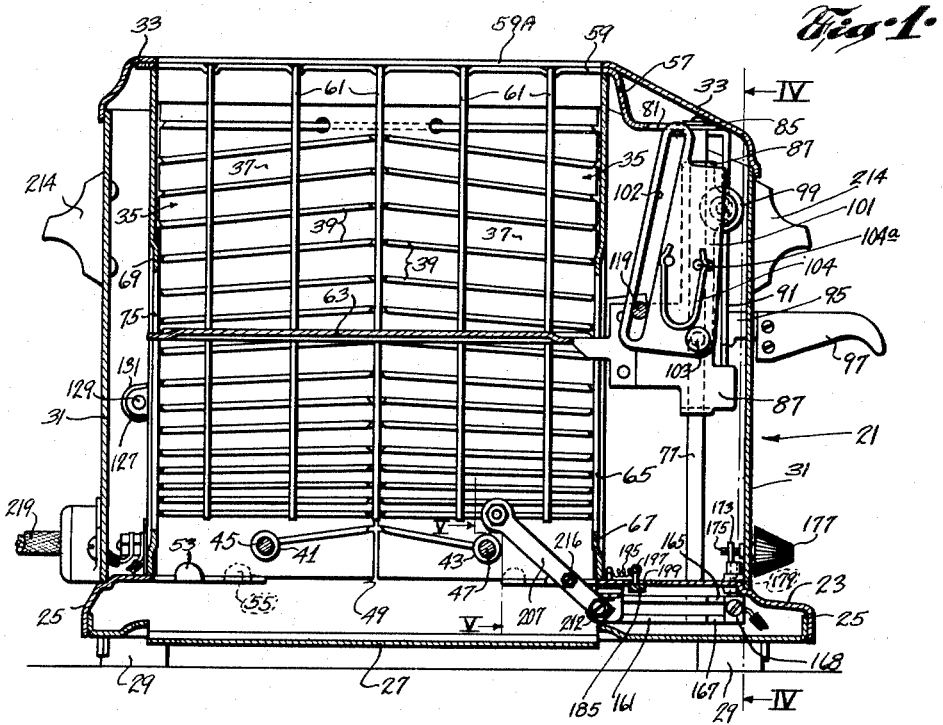

March 11, 1941.  M. IRELAND  2,234,764
ELECTRIC TOASTER
Filed Nov. 25, 1935  4 Sheets-Sheet 1

INVENTOR.
MURRAY IRELAND
BY Roy M. Eilers
ATTORNEY.

March 11, 1941.  M. IRELAND  2,234,764
ELECTRIC TOASTER
Filed Nov. 25, 1935  4 Sheets-Sheet 2
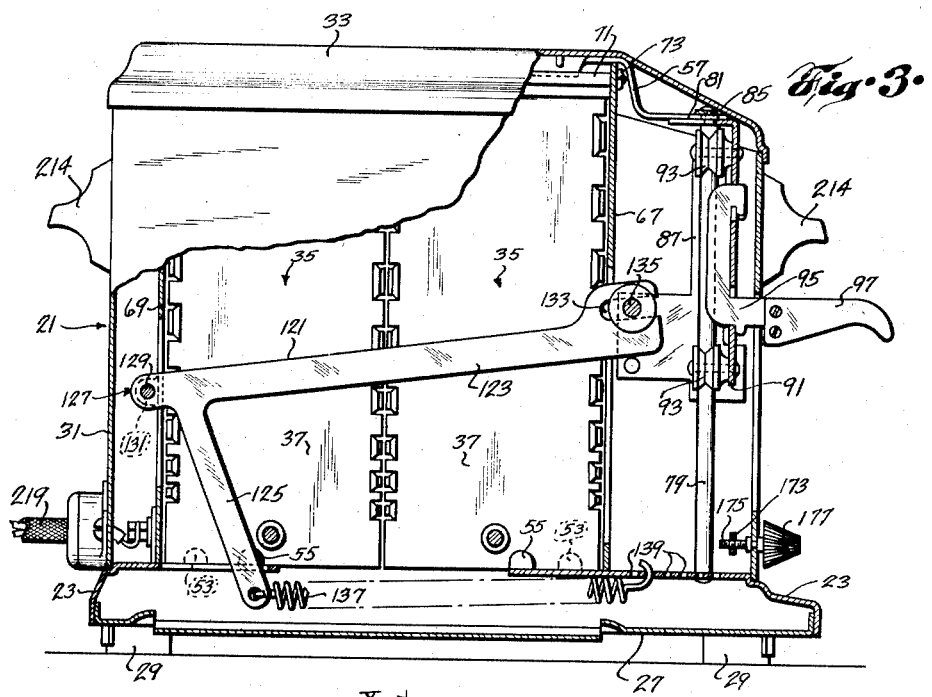
Fig. 3.
Fig. 5.
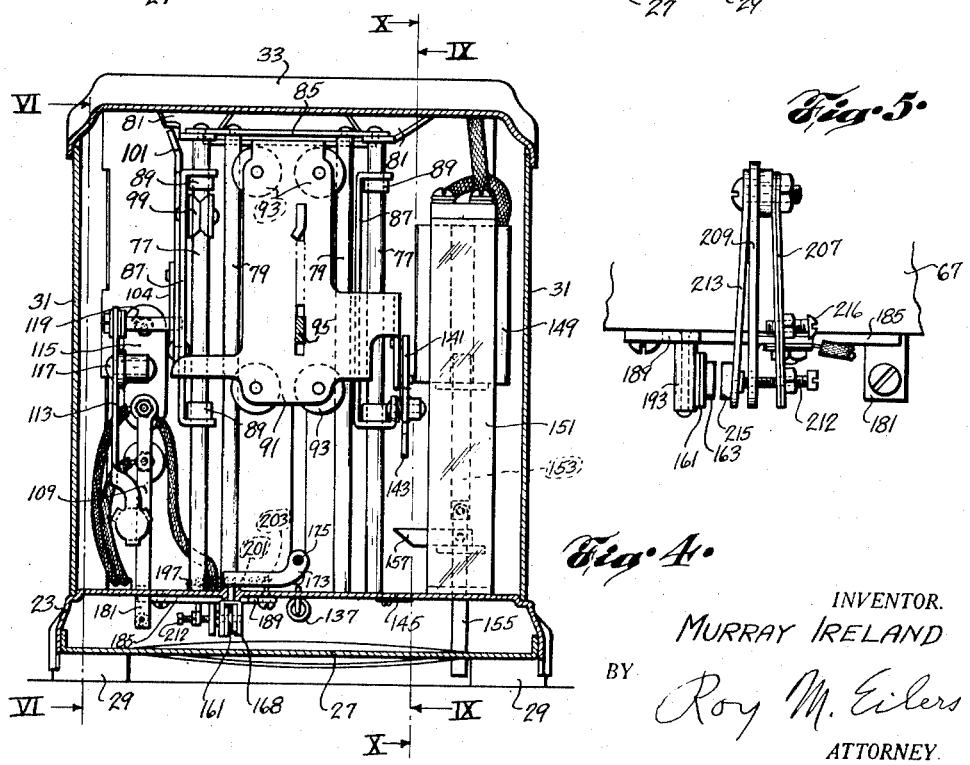
Fig. 4.
INVENTOR.
MURRAY IRELAND
BY Roy M. Eilers
ATTORNEY.

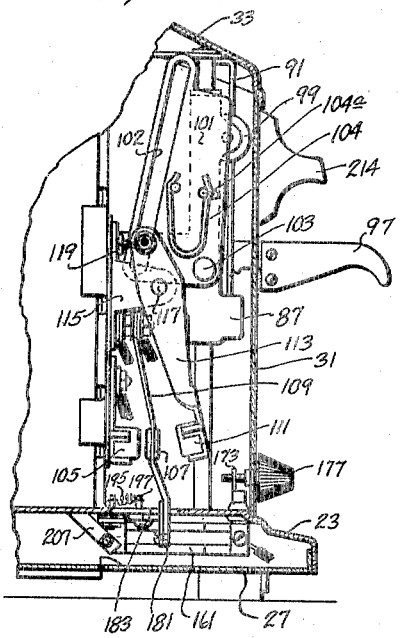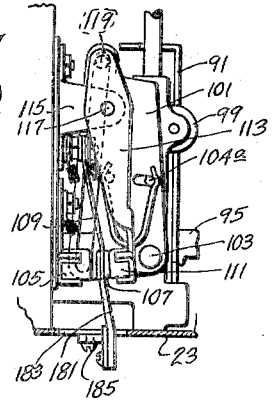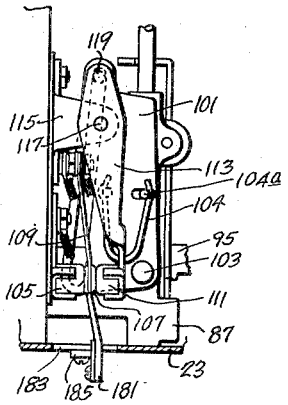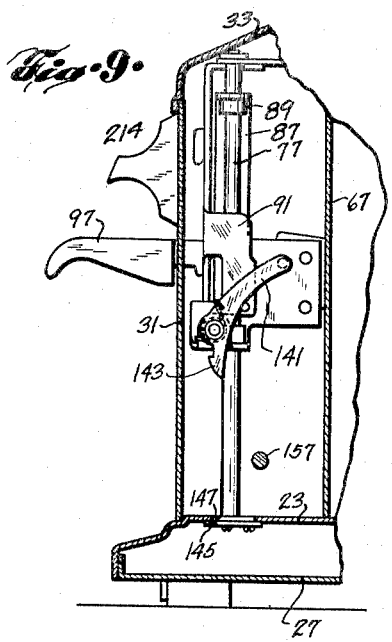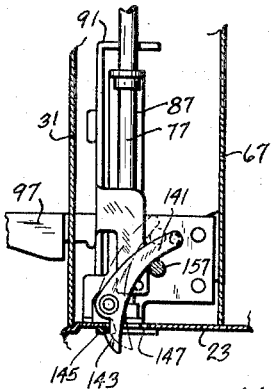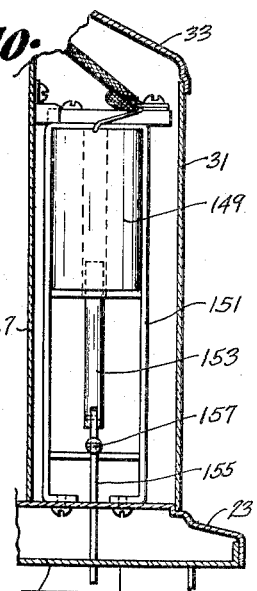

March 11, 1941.  M. IRELAND  2,234,764
ELECTRIC TOASTER
Filed Nov. 25, 1935    4 Sheets-Sheet 4

Fig·12·

Fig·13·

INVENTOR.
MURRAY IRELAND
BY Roy M. Eilers
ATTORNEY.

Patented Mar. 11, 1941

2,234,764

UNITED STATES PATENT OFFICE 2,234,764

ELECTRIC TOASTER

Murray Ireland, St. Paul, Minn., assignor to McGraw Electric Company, Chicago, Ill., a corporation of Delaware Application November 25, 1935, Serial No. 51,397

19 Claims. (Cl. 219—19)

My invention relates to electric cooking devices and particularly to electric toasters.

An object of my invention is to provide a relatively simple thermally actuable timing control means for a cooking device adapted to cook successive portions of food.

Another object of my invention is to provide a relatively simple thermal timer for determining the length of time of a cooking operation in a cooking appliance.

Another object of my invention is to provide a thermally actuable timer comprising a single thermal element, to determine the length of time of a cyclic cooking operation.

Another object of my invention is to provide a simple thermal timing mechanism for a recurring short-time cooking cycle or operation, embodying a bimetal bar occupying substantially the same position at the beginning of each cooking operation and moving away from and back to said position during the cooking cycle.

Another object of my invention is to provide a thermal timing means for an electric cooker such as a toaster, embodying a bimetal element, means to thermally energize the same at the beginning of a cooking cycle or operation and then to thermally deenergize the same, and means operatively engaged by the bimetal element after being thermally deenergized to terminate the cooking operation.

Another object of my invention is to provide a thermal timing means for an electric cooking appliance embodying means to compensate for increase in temperature of the appliance.

Other objects of my invention will either be pointed out during the course of the description of one embodiment of my invention, or will be apparent from such description.

In practicing my invention I provide a cooking appliance, such as an electric toaster comprising a frame or casing, one or more electric heating elements therein, a bread slice support springbiased to non-toasting position, a control switch for the heating elements biased to open position, a manually-actuable means to move the bread slice support to toasting position and the control switch to closed position, and a latch to hold these elements in their actuated positions. A thermal element, which may be in the form of a bimetal member of U-shape, has a heating circuit closely operatively associated therewith, which heating circuit is energized by the manually actuable means. The bimetal element moves or warps first in one direction to deenergize its heating circuit and then in the opposite direction to finally effect release of the latch to thereby end the toasting operation.

Figure 2:
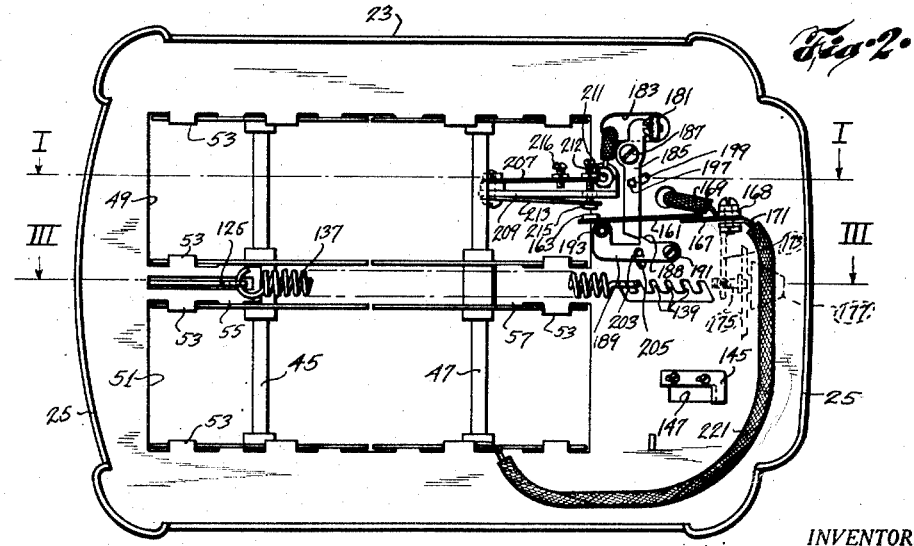

In the drawings,

Figure 1 is a view, in vertical longitudinal section, through a toaster embodying my invention, taken on the line I—I of Fig. 2, Fig. 2 is a bottom plan view of the structure shown in Fig. 1, with the bottom cover removed, Fig. 3 is a view in vertical longitudinal section therethrough, taken on the line III—III of Fig. 2, Fig. 4 is a view in vertical lateral section therethrough, taken on the line IV—IV of Fig. 1, Fig. 5 is a fragmentary vertical sectional view taken on the line V—V of Fig. 1, Fig. 6 is a fragmentary view in vertical longitudinal section, taken on the line VI—VI of Fig. 4, the front part only of the assembly being shown, Fig. 7 is a view similar to Fig. 6, but showing only a portion thereof and showing more particularly the control switch parts in intermediate operative positions, Fig. 8 is a view similar to Fig. 7, but showing the control switch parts in final operative positions, Fig. 9 is a fragmentary view in vertical longitudinal section taken on the line IX—IX of Fig. 4, the front part only being shown, Fig. 10 is a fragmentary view in vertical longitudinal section taken on the line X—X of Fig. 4, the front portion only of the assembly being shown, Fig. 11 is a view similar to Fig. 9, but showing only a portion thereof and showing more particularly the movable parts in actuated position, Fig. 12 is a diagram of connections which I may use in my improved toaster, and Fig. 13 is a view in perspective showing a modified form of thermal element and heating circuit.

While my invention is particularly applicable to electric toasters, I do not desire to be limited to such use, since the inventive concept may be embodied in other equivalent structures operative for the same general purpose and in the same manner, a toaster being only one form of device which may be advantageously controlled to obtain similar or the same results in each cycle or operation of the device.

It is obvious that the cooking of a roast of meat involves in general the raising of the temperature around the roast to a suitable value and then the maintenance thereof at that value for a length of time sufficient to cook the meat to the desired degree, an operation requiring an hour or more. The toasting of a single slice of bread or the simultaneous toasting of a plurality of slices of bread involves substantially the same process, namely the raising of the temperature of the structure and therefore of the slice or slices of bread (and more particularly of the surface thereof) and when the temperature of the surface of a slice of bread has reached a predetermined value, the toasting operation may be terminated. If a reasonable amount of electric energy is translated into heat, it is possible to complete such a toasting cycle in a relatively short time, which time may be on the order of slightly over one minute, and it is therefore obvious that when a single thermal element is used as a timer, it must operate through a cycle of movement in order that it shall properly control the length of time of a toasting operation, and be ready for a successive operation immediately, which means that the thermal element must move first in one direction and then in the reverse direction to substantially its initial position.

It is obvious that the toaster structure will experience a rise in temperature if it is used cyclically and repeatedly, which action is not present to such an extent where the length of time is on the order of several hours. Irrespective of the temperature of the toaster assembly, frame or casing, the temperature of a slice of bread placed in the toaster to be toasted is substantially that of the room in which the toasting operation is taking place. It is therefore desirable that the thermal mass of the toaster assembly be made as small as is consistent with other requirements in order that the effect of the relatively cool slice of bread upon the thermal timing means shall be as great as possible in order that the same may operate properly within the relatively short period of time required by the toasting operation.

Referring to the various figures of the drawings, I have there illustrated a vertical toaster structure designated generally by the numeral 21, which structure or assembly may include a base 23 which may have a depending annular flange 25 to provide a relatively shallow hollow space therebelow, the bottom of which may be closed by a bottom plate 27. Supporting members 29 of suitable heat-insulating material, such as a molded composition, may be secured to the plate 27.

The assembly 21 includes also an outer casing 31 which may be of substantially rectangular shape in contour and may be made of a single metal stamping formed to the desired shape and contour to provide a pleasing external appearance. A top cover member 33 is also associated with the structure and may be secured to the upper edge of the outer casing 31 in any suitable or desired manner. It is to be understood that any suitable or desired means for securing the casing 31 at its lower edge to the upper surface of the base 23 may be employed and as such mechanical means constitute no part of my present invention, they have not been shown or described in detail.

As an operative device constructed by me was applied to or embodied in a "two slice" vertical toaster, I have shown such a two slice toaster in the drawings and it is to be understood that a plurality of vertical extending heating elements are provided, four in all, and designated generally by the numeral 35 in Figs. 1 and 3 of the drawings. These extended heating elements may comprise one or more sheets of mica 37 having wound thereon a suitable resistor wire or strip 39 in a manner well known in the art, the ends of the resistor in each heating element 35 being connected to terminal members 41 and 43 located adjacent the bottom end or ends of the sheets of electric insulating material 37. I may connect all of these resistor members in parallel circuit relation with each other by means of laterally-extending studs or rods 45 and 47, although this again constitutes no part of my present invention.

The top wall of the base is provided with a pair of openings 49 and 51 therein, portions of the edges of the wall being turned up as shown at 53 and 55 in Fig. 1 of the drawings to provide means for holding the lower edges of the sheets 37 in proper operative positions.

A top plate and guard wire support 57 is provided at the upper end of each of the respective cooperating pairs of heating elements, which guard wire support is provided with a longitudinally extending opening 59 therein through which a slice of bread may be inserted into the toaster structure and be withdrawn therefrom after it has been toasted. The cover 33 is provided with a registering opening 59a.

In order that a slice of bread may be held out of contacting engagement with the resistor wires or strips 39, I provide a plurality of depending guard wires 61 between the slice of bread and the resistor. The upper ends of the respective guard wires 61 are bent over and then downwardly into substantially hook shape, extending through openings in the top plate or guard wire support, the downwardly extending top portion assisting also in holding the upper end of the respective heating elements in their proper operative positions.

As it is desired to move the slice or slices of bread from a non-toasting position, that is where at least part of the slice of bread projects from the casing, to a toasting position where all of the slice of bread is located within the casing, I provide a bread slice support 63 between each pair of cooperating heating elements, which bread slice support extends substantially horizontally and is vertically movable between spaced sets of guard wires 61 which extend through openings in the bread slice support.

The bread slice supports have a part thereof extending forwardly through vertically extending slots 65 in an intermediate front wall 67. An intermediate rear wall 69 is provided inside of the casing, the front and rear intermediate inner walls 67 and 69 being connected together and spaced apart by a plurality of horizontally extending rods or bolts 71 which have nuts 73 threaded thereon outside of the respective intermediate walls. The rear end of the respective supports 63 may be extended outwardly through vertical slots 75 in the rear wall 69.

Means for effecting vertical movement of the bread slice supports includes a plurality of vertically extending guide rods 77 and 79, one pair for each bread slice support. The lower ends of these shafts may be extended through the top wall of the base 23 at the front part thereof, while the upper ends thereof may be located either in forwardly extending portions 81 of the top plate, as shown in Fig. 3 of the drawings, or in a spacer bar 85 which extends in a substantially horizontal direction and is interlocked with the upper end of the rods 77 and 79 whereby it serves to hold these rods in proper horizontally spaced positions as well as serving to stiffen and hold the two guard wire supports in desired spaced positions in the assembly. The bread slice supports have secured thereto vertically-extending plates 87 whose upper and lower ends extend laterally therefrom and are provided with bushings 89 through which the rods 77 extend.

A handle support bracket 91, of plate shape, has upper and lower guide rollers 93 rotatably supported thereon, which rollers are adapted to engage the shafts 79. A handle support 95 is carried by the handle support bracket and extends forwardly thereof and may have an actuating knob or handle 97 secured thereto, which handle may be made of heat-insulating material, to be operated by a user of the toaster.

An additional guide roller 99 is mounted on one of the bread slice supports and is shown particularly in the left hand upper corner of Fig. 4 of the drawings.

The left hand member 87 carries a switch actuator plate 101 which has an angularly extending slot 102 therein whose purpose will hereinafter be described. The plate is pivotally mounted on member 87 as by a pivot pin 103, and a spring 104 biases it to the right, as seen in Fig. 1, a stop pin 104a limiting its clockwise turning movement.

A control switch for the cooking appliance includes a fixedly supported contact member 105 which is insulatedly mounted on the front inner wall 67 near the lower edge thereof, and an intermediate contact member 107 which is supported by a spring 109 which normally biases the contact member 107 away from the fixed contact member 105. The switch includes also a contact member 111 mounted on a pivotally supported arm 113 which is mounted on a bracket 115 and carried by a pivot pin 117. The upper end of arm 113 has a laterally extending pin 119 mounted thereon which extends into the slot 102 in the plate 101. It is evident that when the bread slice support is moved downwardly by pressure on the handle 97, the plate 101 will move with it and the pin 119 will be moved to the right as seen particularly in Fig. 6, the drawings, whereby to move contact 111 to the left and initially into engagement with spring supported contact member 107.

Means for biasing the bread slice support to its upper or non-toasting position includes a bell crank lever 121 comprising a substantially horizontally-extending arm 123 and a substantially vertically depending arm 125, the bell crank lever being pivoted at 127 adjacent the rear end of the toaster structure on any suitable support such as a pin 129 which may be supported by bent-out brackets 131 integral with the rear wall 69. The forward end of arm 123 is provided with a slot 133 to cooperate with a horizontally extending shaft 135 carried by the bread slice supports. A coil spring 137 is located below the base 23 and has one end thereof hooked to the lower end of depending arm 125 and the other end hooked into any one of a plurality of hook portions 139 provided in the forward portion of the top wall of base 23.

Means for latching the control switch in closed position and the bread slice support in its toasting position may include a latch arm 141 which is carried by the right hand member 87 at its lower end, the latch 141 being generally in the shape of an arcuate lever pivotally supported intermediate its ends and having a hook portion 143 at its lower end which is adapted to cooperate with a latch plate 145 secured to the bottom surface of base 23 adjacent an opening 147 therein through which the hook member 143 moves when handle 97 is depressed as has hereinbefore been described. Means for releasing the latch may include a coil 149 which is supported in substantially vertical position in a metal frame 151 at the forward part of the assembly and which coil is adapted to energize a movable armature core 153 having depending therefrom a guide bar 155 to which is secured a laterally extending latch release rod 157 which is adapted to engage the upper portion of latch 141 when the armature 153 is energized and moved in a substantially upwardly direction. Rod 157 is mounted for limited pivotal movement in clockwise direction from the position shown in Figure 12 and overlies the latch 149 when armature 153 is in uppermost position, whereby this rod may pass downwardly past latch 141 without affecting the same when it is in latched position, as will be readily apparent to those skilled in the art.

I will now describe the mechanism constituting more particularly my invention and which embodies a cyclically operating thermal element which normally occupies or is located in a predetermined position, which is moved therefrom in one direction by warping because being heat-energized by a suitable heating circuit, which deenergizes the heating circuit and then cools and moves in the opposite direction to return to substantially its normal initial position where it cooperates with other means to energize the latch-releasing means hereinbefore described.

The thermal timing element which I now prefer to use includes a bimetal element 161, of substantially U-shape, which has a contact member 163 mounted thereon at its outer end and which has its legs connected to and supported by two short bimetal strips 165 and 167, which bimetal strips tend to warp in a direction opposite to that in which the bimetal element 161 will warp upon change of temperature. I thereby provide a position-compensating means for the bimetal timing element 161. This bimetal element, and particularly the strips 165 and 167, is so supported on an adjustable pivot support 168 that the two strips 165 and 167 are insulated relatively to each other and have connected thereto circuit wires 169 and 171, respectively, whose connection and use will shortly be set forth. Means for varying the initial position of member 161 may include a bar 173 (see Fig. 12) secured to the pivotal support and engaged by an adjusting screw 175, which screw extends through the front wall of the casing and has an adjusting knob 177 secured thereon, by means of which an operator may cause slight turning movement of the support so as to vary the position of the supporting shaft 179, which may be seen by reference to Figs. 1, 6 and 12 of the drawings.

The intermediate contact member 107 which, as has already been stated, is supported by a spring bar 109, has connected therewith a relatively rigid extension bar 181 moving in a slot 183 in the base 23. A latch or locking lever 185 is pivotally supported intermediate its ends on a pivot pin 187 (see particularly Fig. 2 of the drawings), one end of arm 185 being adapted to be engaged by the depending end of portion 181 while its other end is adapted to engage a projection 188 on latch constituted by a pivotally mounted latch arm 189 which may turn on a pivot pin 191 and which has a tubular member 193 mounted thereon at the other end thereof, which tubular member 193, of electric-insulating material, may be engaged by the bimetal bar 161 under certain conditions of its operation and caused to move in a counterclockwise direction, as seen in Fig. 2 of the drawings. A small coil spring 195 has one end connected to a pin fixed on the base 23 and the other end connected to a pin 197 extending upwardly from the bar 185, which bar is located below the base 23, the pin 197 moving in a slot 199 in the base 23. I provide also a second coil spring 201 extending between the pin 197 and a pin 203, which pin is riveted into arm 189, extends upwardly through a slot 205 in the base 23, the effect of these springs 195 and 201 being to hold the arms 185 and 189 in substantially the relative positions shown in Fig. 2 of the drawings.

Additional means for compensation for increase in temperature of the toaster structure whereby the operation of bimetal member 161 will be such as to cause the toaster to produce similarly toasted slices of bread irrespective of change in temperature of the toaster, may include a bimetal bar 207 which has one end thereof supported on a relatively rigid bar 209 which has its other end secured to and against the bottom surface of base 23 adjacent one of the openings therein hereinbefore described, the member 209 having a lateral lug located against the under surface of base 23 and firmly held by a machine screw 211 and the usual nut thereon. The bimetal bar 207 carries a short machine screw 212 at its outer or movable end which may be held in any desired position and which is adapted to engage the free or movable end of a spring bar 213 having a contact member 215 at its outer end in such position as to be engageable by the contact member 163 on the bimetal element 161.

I may provide an intermediate adjusting screw 216 on the bimetal bar 207, but no claim is made in the present application to this feature of my invention since it is disclosed and claimed in my copending application, Serial No. 20,110, filed May 6, 1935, and assigned to the same assignee as is the present application.

Front and rear handles 214 may be provided to permit carrying the toaster.

Referring now to Fig. 12 of the drawings which shows the diagram of connections which I may use, I have illustrated a source of supply of electric energy as constituted by supply circuit conductors 217 and 218 and it is to be understood that suitable connecting means such as a twin conductor cord may be utilized in a manner well known in the art and as indicated by numeral 219 in Figs. 1 and 3 of the drawings. As has already been stated hereinbefore, the heating elements 35 may be connected in parallel circuit relation and one of the terminal rods as for example 45, may be connected to supply circuit conductor 217. One terminal of the latch release coil 149 is also connected to supply circuit conductor 217. The other terminal rod 47 is connected by a conductor 221 to one terminal of the bimetal timing element 161 and while I have shown it as being connected to bimetal element 167, it is to be understood that this is schematic only and that it may be suitably connected to a fixed part of the supporting means for this bimetal timer. Rod 47 is also connected to fixed contact terminal 105 as by means of a conductor 223.

The second compensating bimetal strip 165 is connected by a conductor 225 to the contact member 107 while the movable contact member 111 on arm 113 is connected by a conductor 227 to the other supply circuit conductor 218. The other terminal of coil 149 of the electromagnetic latch release is connected through a conductor 229 to contact bar 213, which contact bar carries contact member 215.

Let it be assumed that it is desired to toast two slices of bread which are dropped in through the openings in the casing to rest upon the bread slice supports 63, it being understood that suitable electrical connections have been made so that the heating elements may be energized. The operator presses downwardly upon knob 97, moving it downwardly as far as it will go, when hook member 143 of latch arm 141 engages the edge of hardened plate 145 as hereinbefore set forth. The downward movement of the bread slice supports and of the mechanism connected therewith, and particularly of the switch actuating plate 101, causes turning movement of switch arm 113 in a clockwise direction, as seen in Fig. 6 of the drawings, whereby contact 111 is caused to engage contact member 107, which contact member 107 is also moved slightly toward fixed contact member 105, but not to such an extent as to operatively engage the same. Engagement of contacts 107 and 105 is prevented at this time by the biasing spring 109 and the engagement of the depending end of extension 181 with one end of arm 185. It will be noted by reference to Fig. 12 of the drawings that turning movement of arm 185 on its pivot is prevented because of the engagement of the other end thereof with lug 188 on latch arm 189.

The downward movement of the bread slice supports by pressure on the handle 97 has not only moved the slices of bread into the casing and into toasting position therein, but has also effected closure of an energizing circuit traceable as follows: From supply circuit conductor 217 through the plurality of heating elements 35, through conductor 221, through bimetal bar 167 and from there through the bimetal bar 161 of U-shape, through bimetal bar 165, conductor 225, to contact member 107, to contact member 111 and from there through conductor 227 to the other supply circuit conductor 218. This energizes the heating elements 35 which therefore effect toasting of the slices of bread. At the same time an auxiliary heating circuit for the thermal timer is provided, which in this case includes the bimetal member 161 itself and the design and construction thereof is such that upon being heated by reason of the passage of current therethrough, it will warp in a counterclockwise direction as seen in Figs. 2 and 12 of the drawings. Its design and construction is further such that the amount of energy available in the heating circuit is sufficient to cause it to move quite rapidly so that it will, in a relatively short time, engage insulating tube 193 and cause a turning movement of latch arm 189 in a counterclockwise direction, thereby releasing arm 185, which also turns in a counterclockwise direction on its pivot to permit further movement of arm 113, contact 111 thereon and of contact member 107 toward and into engagement with fixed contact member 105. The spring 104, of substantially U-shape, on the switch actuating plate resiliently biases the switch arm 113 toward not only the intermediate contact member 107, but tends to bias this contact in a direction to engage fixed contact member 105, which latter engagement is however, initially prevented by reason of the engagement of extension 181 with one end of arm 185. As soon as arm 185 is free to move, for reasons just above set forth, contact member 107 engages fixed contact member 105, thereby short circuiting the heating circuit through the plurality of bimetal bars and particularly through bimetal member 161. This latter therefore starts to cool and now moves or warps in a clockwise direction or in general, in a direction opposite to that in which it moved at first. This returning warping movement continues with cooling of this bimetal element until the contact member 163 thereon engages contact member 215 on the thermally-controlled spring bar 213, the engagement of these two contact members resulting in energizing coil 149 of the electromagnetic release means and upward movement of latch releasing rod 157 which engages the upper end of arm 141, moving it slightly in a counterclockwise direction to cause release of the shoulder or hook 143, the coil spring 137 then returning all of the parts to the positions shown in Figs. 1, 6 and 9 of the drawings. Engagement of contacts 163 and 215 at the beginning of a toasting operation does not prevent latching by latch 141 because rod 157 overlies this latch when coil 149 is energized. And upon separation of these contacts, armature 153 and rod 157 can drop down to the position shown in Figure 12 without affecting the latch due to the pivotal mounting of rod 157.

It may be here stated that the intermediate positions of the two movable contact members 107 and 109 are shown particularly in Fig. 7 of the drawings, while Fig. 8 of the drawings shows the final positions of the three contact members where they are all in engagement with each other and the thermal energizing circuit of the bimetal timing element has been short circuited.

The bimetal element 207, as has already been stated, extends upwardly into the lower part of the heating chamber (as will be seen more particularly by reference to Fig. 1 of the drawings) so that it will respond to variations in temperature of the toaster assembly structure or casing, but this is not the only location where it may be placed and it may also be located in other places so long as it will readily follow the toaster temperature. The design of bimetal bar 207 and its arrangement is such that it will tend to move in a clockwise direction (as seen in Fig. 5 of the drawings) so that deenergization of the heating circuit and return of the bread slice supports to non-toasting position will be effected sooner when the temperature of the toaster structure or casing is hot than when it is cold. I have found it easily possible to compensate for increase in temperature of the toaster structure by the use of the bimetal element 207 and the modifying screw 216 so that once properly adjusted, toast of the desired type or degree may be obtained irrespective of temperature variation of the toaster resulting from either intermittent or substantially continuous use of the toaster to toast successive slices of bread. It is of course obvious that the bimetal supporting members 165 and 167 aid in securing this uniform toasting operation and it is to be understood that I may vary the length of the strips 165 and 167 as may be necessary in order to obtain the desired results.

While I have thus far described a thermal energizing circuit including the bimetal timing element itself, I desire it to be understood that I do not desire to be limited thereto and I have illustrated a modification of this part of my invention in Fig. 13 where a bimetal bar 235 may be employed instead of the bimetal member 161 of U-shape. I prefer to support the bimetal bar 235 by a short bimetal bar 237 which is suitably secured to one end of bar 235 in such manner as to oppose to a certain extent the warping action thereof under a given change of temperature. The heating circuit may comprise a coil 239 of wire of a suitable ohmic resistance, which coil of wire has one end thereof connected to the bimetal bar 237, so as to energize the same and permit a contact member 241 on the movable end thereof to operate in the same manner as was hereinbefore described for contact member 163 on the bimetal element 161.

As has already been hereinbefore stated, devices of this kind have been built by me and I have found it easy to obtain successive slices of bread toasted to substantially the same degree irrespective of the temperature variations of the toaster caused by intermissions of lesser or greater length between successive operations.

It will be noted that the bimetal timing element is insulated to a certain degree from the heating elements so as not to be unduly affected thereby, nor to respond too great a degree thereto. The movements of the bimetal timing element are cyclic in that the bimetal element, when first thermally energized, moves in one direction, mechanically engages a latch-releasing means whereby the heating circuit closely associated therewith is deenergized, as by short circuiting the same, after which the timing element cools and warps or moves in the reverse or opposite direction, toward the end of which opposite or reverse movement it engages a contact member which cooperates therewith to close an energizing circuit through the coil of an electromagnetic latch-releasing means effective to cause return of the movable parts to their initial inoperative positions. The length of time of a cooking operation therefore depends upon the time required for the main thermal element to warp or move in one direction and then to warp or move in the other direction to substantially its original position. It is therefore possible to use a single main bimetal element to control a cooking device used for short-time repetitive cycle operation and to obtain proper control of the length of time of each operation, when combined with a compensating means, irrespective of the temperature rise or fall of the toaster frame and casing.

While I have shown and described a specific form of device embodying my invention, I do not desire to be limited thereto, but that all modifications covered by the appended claims shall be included, the claims to be limited only by the prior art.

I claim as my invention:

1. In a toaster, the combination with an electric heating element, a control switch for the heating element spring biased to open position and a latch for holding the switch in closed position, of means including a bimetal element for effecting release of the latch, manually actuable means for closing the control switch and latching it in closed position and for causing the bimetal element to be traversed by an electric current and warp in one direction, means actuated by the bimetal element in its movement in said one direction to electrically short circuit said bimetal element and cause it to move in an opposite direction and means operatively engaged by the bimetal element during its movement in the opposite direction and cooperating therewith to effect release of the latch and opening of the switch.

2. A toaster comprising in combination, an electric heating element, a bimetal member, a heating circuit for the bimetal member, a switch for the heating element and the heating circuit spring-biased to open position, a normally open shunt for the heating circuit, manually actuable means to effect closing of the switch, a latch to hold the switch closed, a circuit comprising an electromagnetically actuated latch-releasing means, means mechanically actuated by the bimetal member in its movement in a certain direction to effect closing of the shunt for the heating circuit and a return movement of the bimetal member, a temperature responsive support for the bimetal element tending to reduce its movement in said certain direction with increase of temperature of the toaster, and means engaged by the bimetal member during its return movement to effect energization of the circuit comprising the latch-releasing means and deenergization of the electric heating element.

3. A toaster comprising in combination, an electric heating element, a bimetal member, a heating circuit for the bimetal member, a switch for the heating element and the heating circuit spring-biased to open position, a normally open shunt for the heating circuit, manually actuable means to effect closing of the switch, a latch to hold the switch closed, a circuit comprising an electromagnetically-actuated latch-releasing means, means mechanically actuated by the bimetal member in its movement in a certain direction to effect closing of the shunt for the heating circuit and a return movement of the bimetal member, and means engaged by the bimetal member during its return movement to effect energization of the circuit comprising the latch-releasing means and deenergization of the electric heating element, said last said means including a bimetal element responsive to toaster temperature, whereby the length of time of a toasting operation varies inversely with the toaster temperature.

4. A toaster comprising in combination, an electric heating element, a bimetal member, a heating circuit for the bimetal member, a switch for the heating element and the heating circuit spring-biased to open position, a normally open shunt for the heating circuit, manually actuable means to effect closing of the switch, a latch to hold the switch closed, a circuit comprising an electromagnetically-actuated latch-releasing means, means mechanically actuated by the bimetal member in its movement in a certain direction to effect closing of the shunt for the heating circuit and a return movement of the bimetal member, and means engaged by the bimetal member during its return movement to effect energization of the circuit comprising the latch-releasing means and deenergization of the electric heating element, said last said means including a contact member in the circuit comprising the latch release means, and a bimetallic member controlling the position of the contact member responsive to toaster temperature and effective to reduce the length of time to energize the latch-releasing means with increase of toaster temperature.

5. A toaster comprising in combination, a frame, a fixed contact member thereon, an intermediate contact member spring-biased out of engagement with the fixed contact member, a first latch for holding the intermediate contact member out of engagement with the fixed contact member, a pivotally mounted outer contact member, a bimetal timing element, a heating circuit for the bimetal element, a main heating element for the toaster, an electrical connection between one terminal of the main heating element, the fixed contact member and one terminal of the heating circuit for the bimetal member, an electrical connection between the other terminal of the heating circuit for the bimetal member and the intermediate contact member, manually-operable means to cause the outer contact member to engage the intermediate contact member to thereby simultaneously energize the heating circuit for the bimetal member and the main heating element and cause the bimetal member to warp in one direction, a second latch to hold the manually-operable means in operated position, means whereby the warping bimetal member effects release of the first latch for the intermediate contact member to cause the same to engage the fixed contact member and thereby short circuit the heating circuit for the bimetal member and cause the bimetal member to warp in the opposite direction, a circuit comprising an electromagnetic release means for the second latch and a contact member therefor engageable by the bimetal member during its movement in the opposite direction to effect energization of the release means for the second latch and deenergization of the main heating element.

6. A device as set forth in claim 5 which includes a bimetal element responsive to toaster temperature to shift the position of the last named contact member, to cause deenergization of the main heating element to be effected in a shorter time upon temperature increase of the toaster.

7. A device as set forth in claim 5 in which the bimetal member is of U-shape and constitutes its own heating circuit.

8. A toaster comprising in combination, an electric heating element, a control switch therefor, a bread slice support, a single means for biasing the control switch to open position and the bread slice support to non-toasting position, a manually-actuable means to effect closing of the control switch and to move the bread slice support to toasting position and to latch them in such positions and latch-releasing means including an electromagnetically movable member, a bimetal element of U-shape, supporting means including contact members operatively connected to the open end of the bimetal element, an electric circuit through the bimetal element controlled by the control switch to cause the bimetal element to move in one direction, means mechanically engaged by the bimetal element during its movement in one direction to effect deenergization of the electric circuit through the bimetal element and cause a return movement of the bimetal element in the reverse direction and means engaged by the bimetal element in its return movement to close the circuit for the electromagnetically movable member and effect release of the latch.

9. In a toaster, the combination with an electric heating element, a movable bread slice support biased to non-toasting position, a control switch for the heating element biased to open position, a latch for holding the support in toasting position and the control switch in closed position and manual means for moving the support into toasting position and the control switch into closed position to be held therein by the latch, of means including a bimetal element of U-shape for effecting release of the latch, means whereby actuation of the manual means causes a current to traverse the bimetal element and effect movement of a part thereof in one direction, means mechanically actuated by the bimetal element in its movement to electrically short circuit itself and cause it to move in the opposite direction and an electric latch-releasing circuit closed by the opposite movement of the bimetal element.

10. In a toaster, the combination with an electric heating element, a control switch therefor, a bread slice support, a single means for biasing the switch to open position and the bread support to non-toasting position and a latch for holding the switch in closed position and the bread support in toasting position, of a thermally-actuable timing means to effect release of the latch including a bimetal bar of U-shape electrically connected in series circuit with the heating element, manual means for effecting simultaneous energization of the electric heating element and the bimetal bar of U-shape to cause the latter to warp in one direction, means actuated mechanically by the bimetal bar in its movement in said one direction to short circuit the bimetal element and cause it to warp in a reverse direction and an electric latch-release circuit closed by the reverse movement of the bimetal bar.

11. A toaster comprising, in combination, a frame, a main heating element and a fixed contact on the frame, an intermediate contact supported from the frame and spring-biased out of engagement with the fixed contact, a pivotally mounted outer contact, a bimetal bar of U-shape, conductors electrically connecting one terminal of the main heating element with the fixed contact and one leg of the bimetal bar of U-shape, an electrical connection between the other leg of the bimetal bar of U-shape and the intermediate contact, manually operable means to cause the outer contact to engage the intermediate contact to thereby simultaneously energize the main heating element and the bimetal bar, a first latch to hold the manually operable means in operated position, a second latch to hold the intermediate contact out of engagement with the fixed contact, means mechanically actuated by the energized bimetal bar moving in one direction to release said second latch and permit engagement of the intermediate and the fixed contact to electrically short circuit the bimetal bar and cause it to move in the opposite direction and an electric circuit closed by the bimetal bar in its movement in the opposite direction to effect release of the first latch.

12. In an automatic toaster, two bimetallic strips, means for alternately heating and cooling one strip, means for employing each cycle of heating and cooling to measure a toasting interval, means for heating the second strip independent of the first strip and in proportion to the rise in temperature of the toaster during rapidly recurring toasting operations, and means for causing said second strip in heating to progressively shorten successive toasting intervals.

13. In an automatic toaster, a toasting compartment including a source of heat, a timer including a bimetallic strip and a second source of heat, means for measuring a toasting interval by heating said strip from said second source and by then cooling the strip, a second bimetallic strip arranged to receive heat from said compartment, and means including said second strip for progressively shortening successive toasting intervals measured by the heating and cooling of said first strip as the temperature of said compartment rises.

14. In an automatic electric toaster having heating means, a main thermally-actuable element, controllable means for heating said element and allowing the same to cool, a second thermally-actuable element responsive to toaster temperature, and means controlled jointly by said first element during cooling thereof and by said second element to terminate a toasting operation.

15. The combination with cooking means, of a timer for establishing intervals of the cooking action including a main and an auxiliary warp-acting bimetallic thermally responsive member, heating means operative on said main bimetal member only until it has reached a predetermined high temperature and warped to a predetermined extent in one direction, thereby permitting the main bimetal member to cool while the cooking action is continued, and means including said auxiliary bimetal member for interrupting the cooking action when main thermally responsive timer member has cooled and warped to a predetermined extent in the opposite direction and the auxiliary bimetal member has been heated by the cooking action to a given temperature, said auxiliary bimetal member being operative to shorten successive toasting intervals.

16. In an automatic electric toaster having toast heating means, timing means comprising a thermally actuable element, a controllable heater for said element, and a thermally responsive device subject to heat from the toast heating means and means controlled jointly by said thermally actuable element during cooling thereof and by said thermally responsive device to terminate a toasting operation.

17. An automatic electric toaster comprising a main and an auxiliary electric heater, a thermal timing means including a bimetal bar in heat receiving relation with the auxiliary heater, three contact members normally yieldingly biased out of engagement with each other, means to cause electrical contact of two of said contact members and cause energization of the main and the auxiliary heater to initiate a toasting operation and the operation of the thermal timing means, means including the bimetal bar for causing electrical contact of all of said contact members when the bimetal bar has been heated to a predetermined high temperature to substantially deenergize said auxiliary heater, said bimetal bar then cooling and causing disengagement of all of said contact members from each other when it has cooled to a predetermined lower temperature to terminate a toasting operation.

18. An automatic electric toaster comprising a toast heater, a thermal timing device including a bimetal element of U-shape, three contact members normally yieldingly biased out of engagement with each other, means to cause two of said contact members to electrically engage each other to effect current flow through the toast heater and through the bimetal element to initiate the operation of the toaster and of the thermal timing device, means including said bimetal element for effecting electrical engagement of all of said contact members when the bimetal element has been heated to a predetermined high temperature to substantially stop current flow through the bimetal element and means including said bimetal element for causing electrical disengagement of all of said contact members when the bimetal element has cooled to a predetermined lower temperature to terminate a toasting operation.

19. In an automatic toaster, a toasting compartment, a slice carrier movable into and out of toasting position in said compartment, means for moving the carrier out of toasting position set by said carrier when it is moved into said compartment, a timer comprising a bimetallic strip, means for releasing said carrier means by heating and cooling said strip, including heating means independent of the heating means in said toasting compartment, a second bimetallic strip arranged to receive heat from said toasting compartment and means including said second strip for changing the time interval measured by the first said strip.

MURRAY IRELAND.